(12) United States Patent
McCloskey

(10) Patent No.: US 8,336,761 B1
(45) Date of Patent: Dec. 25, 2012

(54) BARCODE VERIFICATION

(75) Inventor: Scott McCloskey, Minneapolis, MN (US)

(73) Assignee: Honeywell International, inc., Morristown, NJ (US)

( * ) Notice: Subject to any disclaimer, the term of this patent is extended or adjusted under 35 U.S.C. 154(b) by 0 days.

(21) Appl. No.: 13/233,651

(22) Filed: Sep. 15, 2011

(51) Int. Cl.
| | |
|---|---|
| G06F 17/00 | (2006.01) |
| G06F 19/00 | (2011.01) |
| G06Q 30/00 | (2012.01) |
| G06Q 90/00 | (2006.01) |
| G06Q 20/00 | (2012.01) |
| G06K 15/00 | (2006.01) |
| G06K 7/00 | (2006.01) |
| G06K 7/10 | (2006.01) |
| G06K 7/14 | (2006.01) |
| G06K 15/12 | (2006.01) |
| G06K 9/00 | (2006.01) |

(52) U.S. Cl. .............. 235/375; 235/462.01; 235/462.41; 235/454; 235/435; 235/383; 235/385; 705/16; 382/141; 382/143

(58) Field of Classification Search ........... 235/375, 235/383, 385, 435, 454, 462.01, 462.41; 705/16; 382/141, 143
See application file for complete search history.

(56) References Cited

U.S. PATENT DOCUMENTS

| | | | | |
|---|---|---|---|---|
| 5,609,223 | A * | 3/1997 | Iizaka et al. | 186/61 |
| 6,726,104 | B2 * | 4/2004 | Schuessler et al. | 235/462.09 |
| 6,892,947 | B1 * | 5/2005 | Jam et al. | 235/462.01 |
| 6,948,068 | B2 * | 9/2005 | Lawandy et al. | 713/176 |
| 7,246,745 | B2 * | 7/2007 | Hudnut et al. | 235/383 |
| 7,248,754 | B2 * | 7/2007 | Cato | 382/318 |
| 7,422,147 | B2 * | 9/2008 | Rosenbaum | 235/383 |
| 7,447,329 | B2 * | 11/2008 | Choi et al. | 382/100 |
| 7,448,542 | B1 * | 11/2008 | Bobbitt et al. | 235/383 |
| 7,909,248 | B1 * | 3/2011 | Goncalves | 235/383 |
| 8,068,674 | B2 * | 11/2011 | Goncalves | 382/194 |
| 8,081,348 | B2 * | 12/2011 | Hosoda | 358/3.28 |
| 2002/0113125 | A1 * | 8/2002 | Schuessler et al. | 235/462.1 |
| 2002/0170966 | A1 * | 11/2002 | Hannigan et al. | 235/462.01 |
| 2002/0181015 | A1 * | 12/2002 | Whale | 358/1.15 |
| 2003/0053715 | A1 * | 3/2003 | Chamberlain | 382/294 |
| 2003/0179920 | A1 * | 9/2003 | Hooker et al. | 382/141 |
| 2003/0205620 | A1 * | 11/2003 | Byun et al. | 235/462.14 |
| 2003/0219145 | A1 * | 11/2003 | Smith | 382/100 |
| 2004/0065740 | A1 * | 4/2004 | Mergenthaler et al. | 235/462.14 |
| 2005/0178822 | A1 * | 8/2005 | Siuta et al. | 235/379 |
| 2005/0189411 | A1 * | 9/2005 | Ostrowski et al. | 235/383 |
| 2005/0189412 | A1 * | 9/2005 | Hudnut et al. | 235/383 |
| 2006/0157574 | A1 * | 7/2006 | Farrar et al. | 235/494 |
| 2007/0290043 | A1 * | 12/2007 | Russell et al. | 235/462.14 |
| 2008/0011846 | A1 * | 1/2008 | Cato | 235/435 |
| 2008/0027817 | A1 * | 1/2008 | Iizaka et al. | 705/20 |
| 2008/0149725 | A1 * | 6/2008 | Rosenbaum | 235/462.41 |
| 2009/0222354 | A1 * | 9/2009 | Murphy et al. | 705/21 |
| 2009/0272801 | A1 * | 11/2009 | Connell et al. | 235/383 |

(Continued)

*Primary Examiner* — Daniel Walsh
(74) *Attorney, Agent, or Firm* — Brooks, Cameron & Huebach, PLLC.

(57) ABSTRACT

Methods, machine-readable media, and devices for barcode verification are described herein. One method includes capturing an image of a barcode included with an item and an image of packaging associated with the item proximate to the barcode, decoding the image of the barcode included with the item to obtain item identification information represented by the barcode, extracting item identification information from the image of the packaging associated with the item, and determining whether the item identification information decoded from the image of the barcode matches the item identification information extracted from the image of the packaging associated with the item.

20 Claims, 4 Drawing Sheets

U.S. PATENT DOCUMENTS

| | | | |
|---|---|---|---|
| 2009/0284802 A1* | 11/2009 | Yeap et al. | 358/3.28 |
| 2009/0295144 A1* | 12/2009 | Winkelhorn | 283/94 |
| 2009/0307097 A1* | 12/2009 | De Faria | 705/17 |
| 2009/0319388 A1* | 12/2009 | Yuan et al. | 705/26 |
| 2010/0054596 A1* | 3/2010 | Yun | 382/173 |
| 2010/0217678 A1* | 8/2010 | Goncalves | 705/22 |
| 2010/0329575 A1* | 12/2010 | Scalise et al. | 382/218 |
| 2011/0135160 A1* | 6/2011 | Sagan et al. | 382/108 |
| 2011/0215147 A1* | 9/2011 | Goncalves | 235/383 |

* cited by examiner

BARCODE VERIFICATION

TECHNICAL FIELD

The present disclosure relates to methods, machine-readable media, and devices for bar code verification.

BACKGROUND

In retail settings, barcode substitution can be a problem. Barcode substitution can occur when a customer replaces a barcode of an item with that of a less expensive item. This can allow the customer to pay a reduced price for the item.

In some situations, a retail employee can visually determine whether a barcode on an item has been substituted. Such a visual determination, however, can be susceptible to human error and/or can increase the time that it takes to process the items of a customer in order to check the customer out. Further, a visual determination may not be effective where self-checkout lanes are used in a store, because an employee who is monitoring the self-checkout lanes may not be in a position to view particular characteristics of items.

In some previous approaches, barcode substitution was detected by measuring a weight of a scanned item and comparing the measured weight with a recorded weight for what the item is expected to weigh. If the measured weight of the item varies from the expected weight, this may indicate that barcode substitution has occurred. However, such previous approaches may not be able to detect barcode substitution when a customer substitutes a barcode from a less expensive item of a similar weight.

DETAILED DESCRIPTION

Methods, machine-readable media, and devices for barcode verification are described herein. For example, one or more embodiments include capturing an image of a barcode included with an item and an image of packaging associated with the item proximate to the barcode, decoding the image of the barcode included with the item to obtain item identification information represented by the barcode, extracting item identification information from the image of the packaging associated with the item, and determining whether the item identification information decoded from the image of the barcode matches the item identification information extracted from the image of the packaging associated with the item.

Embodiments of the present disclosure can reduce and/or prevent barcode substitution. In an example, embodiments can determine whether item identification information from a barcode located on a package matches item identification information extracted from the packaging associated with the item. This can prevent barcode substitution because item identification information associated with the packaging of the item can be unique to the packaging, making it difficult to find a barcode from an item that has the same packaging.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of differences" can refer to one or more differences.

Figure 1:
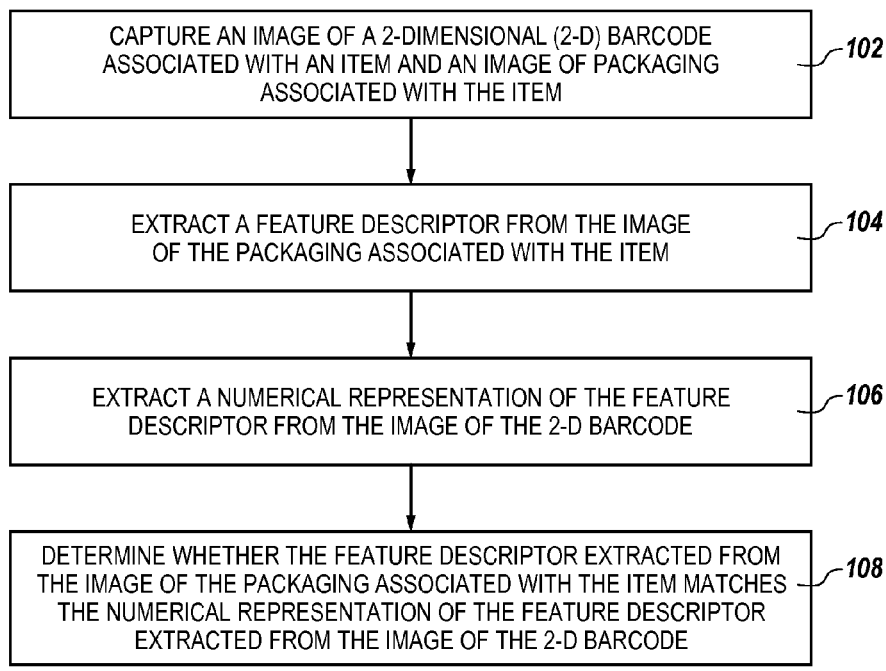
FIG. 1 illustrates a method for barcode verification according to one or more embodiments of the present disclosure.

FIG. 1 illustrates a method for barcode verification according to one or more embodiments of the present disclosure. The method can be performed by, for example, by the device further described herein in connection with FIG. 4.

A barcode can be a machine-readable representation of data, which can store information such as item identification information associated with an item that the barcode is attached to. In an example, barcodes can include 1-Dimensionsal (1-D) and/or 2-dimensional (2-D) barcodes. 1-D barcodes can be defined as a barcode having varying widths and spacings of lines. 2-D barcodes can be defined as a barcode having geometric patterns, for example, dots, squares, hexagons, and/or rectangles. Both 1-D and 2-D barcodes can include a representation of data, although a 2-D barcode can contain more data than a 1-D barcode, depending on the geometric patterns contained in the 2-D barcode.

At block 102, the method includes capturing an image of a 2-D barcode associated with an item and an image of packaging associated with the item. In an example, the image of the 2-D barcode associated with the item and/or the image of packaging associated with the item can be captured with a number of imagers. For example, one imager can be configured to take an image of the barcode and/or packaging. Alternatively, and/or in addition, multiple imagers can be configured to take multiple images of the barcode and/or packaging.

The image of the 2-D barcode and the packaging can include an image of the 2-D barcode and the packaging proximate to the 2-D barcode. For instance, the image can include an image of the 2-D barcode and packaging proximate to the 2-D barcode on a same face of the packaging as the 2-D barcode. Alternatively, and/or in addition, multiple images can be taken of the barcode and/or packaging. In an example, if the product is in a box with a barcode on one side, an image can be taken of the barcode with a first imager and an image can be taken of a side of the box opposite the barcode with a second imager.

At block 104, the method includes extracting a feature descriptor from the image of the packaging associated with the item. In some embodiments, the feature descriptor can include a color descriptor, texture descriptor, and/or shape descriptor from the image of packaging associated with the item.

Color descriptors can include a Color Layout Descriptor, which can be designed to capture spatial distribution of color in an image, for example. Texture descriptors can include, for example, an Edge Histogram Descriptor, which can be designed to represent spatial distribution of edges. Shape descriptors can include, for example, a Contour Based Shape Descriptor, which can be designed to map a contour of a given object to some representation. In an example, a feature descriptor can be extracted from a logo associated with the item and/or artwork located on the packaging associated with the item, although examples are not so limited.

In some embodiments, the feature descriptor can be a Scale Invariant Feature descriptor, which can be defined as a feature that can be invariant to image scale, rotation, and illumination. For instance, the Scale-Invariant Feature can be recognized even though a scale of the feature has changed because a viewpoint from which the feature is viewed has changed, an angle of rotation from which the viewpoint from which the feature is viewed has changed, and/or an illumination of the image has changed. In an example, Scale Invariant Feature Transform (SIFT) can be used to transform image data into scale-invariant coordinates relative to local features. For instance, a logo may contain a black square with a white circle in the middle of the black square, which is located relative to an edge of a package that contains an item.

In some embodiments, the method can include performing a quantization of the feature descriptor extracted from the image of the packaging associated with the item. Alternatively, and/or in addition, the method can include representing the quantization of the feature descriptor extracted from the image of the packaging associated with the item as a numerical value. In an example, SIFT can be used to perform a quantization of the feature descriptor to obtain a number of vectors, which can represent the feature descriptor as a numerical value.

At block 106, the method includes extracting a numerical representation of the feature descriptor from the image of the 2-D barcode. For instance, by capturing an image of the 2-D barcode with an imager, the barcode can be associated with information relating to the feature descriptor from the image of the packaging. In an example, the information relating to the feature descriptor extracted from the image of the 2-D barcode can include a numerical representation of scale invariant coordinates of the feature descriptor. Alternatively, and/or in addition, the information relating to the feature descriptor extracted from the image of the 2-D barcode can include a numerical representation of the feature descriptor, such as a numerical representation of color, shape, and/or texture, for example.

At block 108, the method includes determining whether the feature descriptor extracted from the image of the packaging associated with the item matches the numerical representation of the feature descriptor extracted from the image of the 2-D barcode. In an example, a determination of whether the numerical value of the feature descriptor extracted from the image of the packaging associated with the item matches the numerical representation of the feature descriptor extracted from the image of the 2-D barcode can be made. Upon a determination that the numerical value of the feature descriptor extracted from the image of the packaging associated with the item matches the numerical representation of the feature descriptor extracted from the image of the 2-D barcode, a transaction associated with the item can be allowed to proceed.

For instance, when the transaction is performed at a point of sale terminal with a merchant. The merchant can scan the 2-D barcode of the item to acquire pricing information from the 2-D barcode. When the merchant scans the 2-D barcode, the determination of whether barcode substitution has occurred (e.g., the numerical value of the feature descriptor extracted from the image of the packaging does not match the numerical representation of the feature descriptor extracted from the image of the 2-D barcode) can be performed. In an example, if barcode substitution is detected, a terminal (e.g., computer, mobile device, mobile phone) at the point of sale can display an indication to the merchant that barcode substitution has occurred. Alternatively, and/or in addition, the terminal can transmit a notification to a store manager, a security agency, and/or police that barcode substitution has occurred, for example.

Figure 2:
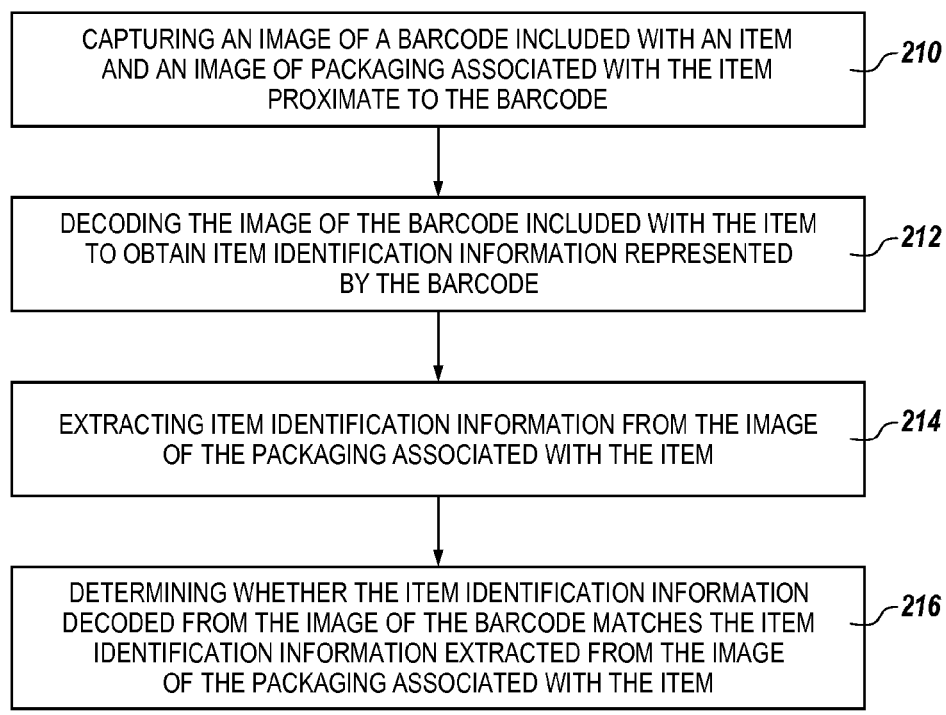
FIG. 2 illustrates a method for barcode verification according to one or more embodiments of the present disclosure.

FIG. 2 illustrates a method for barcode verification according to one or more embodiments of the present disclosure. The method can be performed by, for example, the device further described herein in connection with FIG. 4.

The method includes capturing an image of a barcode included with an item and an image of packaging associated with the item proximate to the barcode at block 210. In an example, the method can include capturing an image of the barcode with a barcode scanner and capturing an image of the packaging associated with the item proximate to the barcode with at least one of a scanner and/or camera. Barcodes can be read by capturing an image of a barcode through an imager (e.g., a device employing a light source and a light sensor to transform optical impulses generated from the light source reflecting off of the barcode into electrical signals). In an example, capturing an image of a barcode can be accomplished through use of a scanner, barcode reader, and/or camera. Upon capturing the image of the barcode, software can be used to associate the electrical signals with data (e.g., universal product code, price).

At block 212, the method includes decoding the image of the barcode included with the item to obtain item identification information represented by the barcode. In an example, decoding the image of the barcode included with the item to obtain item identification information includes decoding the image of the barcode included with the item to obtain a universal product code.

The method includes, at block 214, extracting item identification information from the image of the packaging associated with the item. For instance, extracting the item identification information from the image of the packaging associated with the item can include extracting a universal product code (UPC) and/or other identification information located on the packaging. In an example, the UPC can be embedded in a watermark on the packaging. In such a case, extracting the UPC located on the packaging can include extracting the UPC from a watermark located on the packaging.

Embedding the UPC in a watermark can make it difficult for an individual to reproduce the UPC and place the reproduced UPC on a package that the individual intends to substitute a barcode for. In some embodiments the UPC can be embedded in the packaging associated with the item when the packaging is manufactured, as an embedded barcode. Alternatively, and/or in addition, the UPC can be embedded in the packaging associated with the item as a number.

At block 216, the method includes determining whether the item identification information decoded from the image of the barcode matches the item identification information extracted from the image of the packaging associated with the item. Some embodiments can include allowing and/or disallowing a transaction associated with the item to proceed when the item identification information decoded from the image of the barcode and the identification information extracted from the image of the packaging associated with the item match and/or do not match.

In an example, a UPC that has been decoded from the image of the barcode can be compared to the UPC that has been extracted from the image of the packaging associated with the item. If the UPC decoded from the image of the barcode matches the UPC extracted from the image of the packaging associated with the item, then barcode substitution may not have occurred and a transaction can be allowed to proceed.

In an additional example, if the UPC decoded from the image of the barcode does not match the UPC extracted from the image of the packaging associated with the item, then barcode substitution may have occurred. Accordingly, the method can include providing a notification when the item identification information decoded from the image of the barcode does not match the item identification information extracted from the image of the packaging associated with the item. Alternatively, and/or in addition, the transaction can be blocked from proceeding when barcode substitution has occurred. In an example, a terminal located at the point of sale may become inoperable until a merchant selects an option to proceed through an interface located on the terminal and/or enters a verification code through the interface, verifying that the transaction can proceed.

In some embodiments, the method can include using the item identification information decoded from the image of the barcode to look up item identification information associated with the packaging of the item from a database when the barcode is 1-D, wherein the item identification information includes a feature descriptor from the packaging associated with the item. In some instances, 1-D barcodes can not hold as much information as 2-D barcodes. In an example, a 1-D barcode can become wider as more information is placed in the 1-D barcode because the 1-D barcode makes use of one dimension (e.g., the 1-D barcode spaces lines closer or further apart to represent information).

A 2-D barcode, however, can make use of a horizontal dimension and a vertical dimension to alter spacing between geometric patterns that form the barcode. As such, a 1-D barcode may not be able to hold enough information to include a feature descriptor from the packaging associated with the item. By storing information associated with a feature descriptor from the packaging associated with the item, this information is not required to be stored in the 1-D barcode. Rather, information can be stored in the barcode, which can be used to look up information associated with the feature descriptor from the packaging associated with the item in the database.

In some embodiments, the method can include extracting a feature descriptor from the image of the packaging associated with the item. Extracting the feature descriptor from the image of the packaging associated with the item can be accomplished in a manner analogous to that discussed in relation to FIG. 1.

In some embodiments, the method can include determining whether the feature descriptor from the packaging associated with the item that is stored in the database matches the feature descriptor extracted from the image of the packaging associated with the item. This can be accomplished in a manner analogous to that discussed in relation to FIG. 1, with the exception that the feature descriptor can be stored in the database instead of the 2-D barcode.

Figure 3:
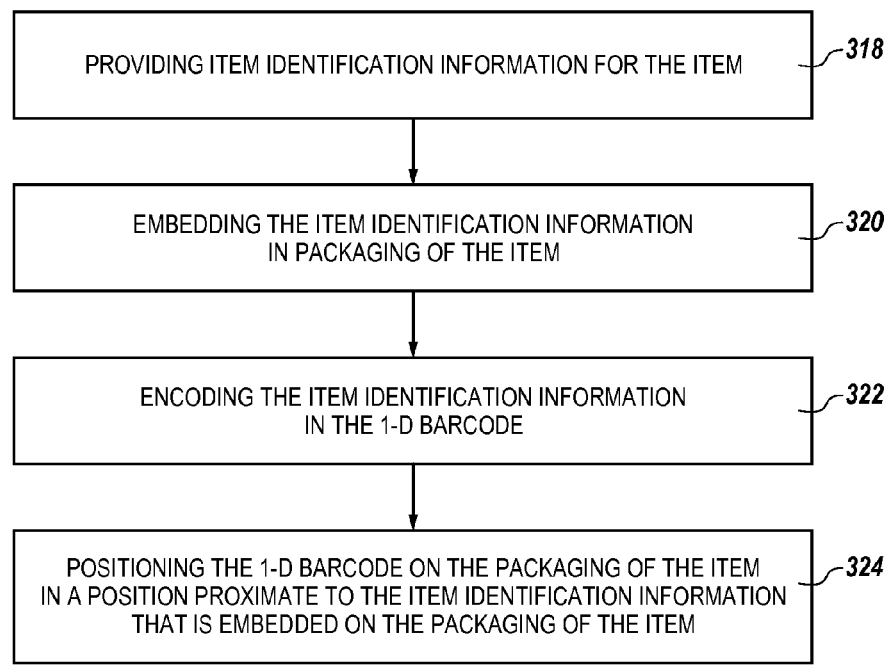
FIG. 3 illustrates a method for associating a 1-dimensional barcode with an item, according to one or more embodiments of the present disclosure.

FIG. 3 illustrates a method for associating a 1-D barcode with an item according to one or more embodiments of the present disclosure. The method can be performed by, for example, the device further described herein in connection with FIG. 4.

The method includes providing item identification information for the item at block 318. In an example, this can include providing a UPC for the item. Alternatively, and/or in addition, providing item identification information can include providing any code that identifies the item.

At block 320, the method includes embedding the item identification information in packaging of the item. Embedding the item identification information in packaging of the item can be accomplished in a manner analogous to that discussed in relation to FIG. 2. In an example, embedding the item identification information in packaging of the item can include embedding the item identification information in a watermark, barcode, and/or number included on the packaging of the item.

The method, at block 322, includes encoding the item identification information in the 1-D barcode. In an example, item identification information embedded in the 1-D barcode can be the same and/or different from item identification information embedded in packaging of the item. For instance, when identification information embedded in the 1-D barcode is different from item identification information embedded in packaging of the item, an imager and/or computing device coupled with the imager can be programmed to recognize what item identification should be associated with item identification information embedded in packaging of the item and/or item identification information embedded in the 1-D barcode.

The method includes positioning the 1-D barcode on the packaging of the item in a position proximate to the item identification information that is embedded on the packaging of the item, at block 324. In some embodiments, the 1-D barcode can be placed in a position on the packaging of the item such that an imager (e.g., scanner, barcode reader, and/or camera) can capture an image of both the 1-D barcode and the item identification information that is embedded on the packaging in one image. Alternatively, and/or in addition, multiple images can be taken from one or more imagers to capture multiple images that include the 1-D barcode and item identification information that is embedded on the packaging.

In some embodiments, positioning the 1-D barcode on the packaging of the item can include printing the 1-D barcode on the packaging of the item. In an example, this can be performed when the packaging of the item is manufactured. Alternatively, and/or in addition, printing the 1-D barcode on the packaging of the item can be performed after the packaging of the item is manufactured.

In some embodiments, positioning the 1-D barcode on the packaging of the item includes printing the 1-D barcode on a substrate and affixing the substrate to the packaging of the item. For example, the 1-D barcode can be printed on paper and adhered to the packaging of the item with an adhesive. Alternatively, and/or in addition, the 1-D barcode can be integrated with an electronic article surveillance tag. For instance, the 1-D barcode can be printed on a paper and/or plastic backing and/or casing of the electronic article surveillance tag.

Alternatively, and/or in addition, some embodiments of the present disclosure can include a method for associating a 2-D barcode with an item. In some such embodiments, the method can include capturing an image of packaging associated with the item. In an example, the image of an area of the packaging associated with the item that includes a feature descriptor, such as a color descriptor, texture descriptor, and/or shape descriptor can be captured with a digital camera and/or scanner, for example. The feature descriptor can be extracted from the image of the packaging associated with the item in a manner analogous to that discussed in relation to FIG. 1.

In some embodiments, the method can include performing a quantization of the feature descriptor extracted from the image of the packaging associated with the item. Alternatively, and/or in addition, the medium can represent the quantization of the feature descriptor extracted from the image of the packaging associated with the item as a numerical value. In an example, SIFT can be used to perform a quantization of the feature descriptor to obtain a vector, which can represent the feature descriptor as a numerical value.

In some embodiments, the method can include embedding the numerical value that represents the feature descriptor in the 2-D barcode. The barcode can then be placed on the packaging associated with the item, in a manner analogous to that discussed in relation to FIG. 3.

Figure 4:
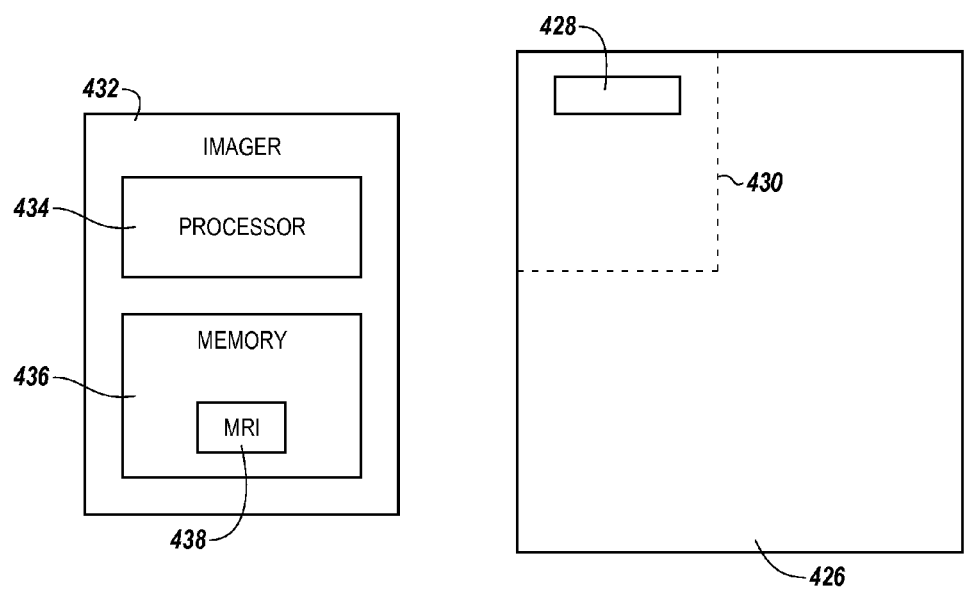
FIG. 4 illustrates a device for barcode verification, according to one or more embodiments of the present disclosure.

FIG. 4 illustrates a device for barcode verification according to one or more embodiments of the present disclosure. The device can be an imager 432 that can capture an image of a barcode 428 included with an item 426 and an image of packaging 430 associated with the item proximate to the barcode 428.

The imager 432 can include a light source (e.g., laser) that provides an illumination beam for illumination of barcode 428, which can be 1-D and/or 2-D, and/or the packaging 430 associated with the item proximate to the barcode 428. Alternatively, and/or in addition, imager 432 can include a light sensor that can transform optical impulses generated from the light source reflecting off of the barcode 428 and/or packaging 430 associated with the item proximate to the barcode 428 into electrical signals.

Imager 432 can be a computing device and/or can be in communication with a computing device, such as a personal and/or business computer (e.g., laptop, desktop), for example. Alternatively, and/or in addition, imager 432 can be a mobile device (e.g., barcode reader, scanner, camera, mobile phone, personal digital assistant (PDA), or other handheld computing device, etc.).

Imager 432 can, for example, include a processor 434 and a memory 436. Although not illustrated in FIG. 1, memory 436 can be coupled to processor 434.

Memory 436 can be volatile or nonvolatile memory. Memory 436 can also be removable (e.g., portable) memory, or non-removable (e.g., internal) memory. For example, memory 436 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 436 is illustrated as being located in imager 432, embodiments of the present disclosure are not so limited. For example, memory 436 can also be located internal to another computing resource (e.g., enabling computer readable instructions to be downloaded over the Internet or another wired or wireless connection).

Memory 436 can include machine-readable instructions 438. Machine-readable instructions 438 can include a number of programs such as applications (e.g., software objects and/or modules, among others) and an operating system. MRI can be executed by the processor 434 to carry out the functions as described herein. In some embodiments, some or all of the functions are carried out via hardware in lieu of a processor-based system.

Programs can include routines, objects, components, data structures, etc. that can perform particular tasks or implement particular abstract data types. Distributed computing environments may be used where tasks are performed by remote processing machines that are linked through a communications network or other data transmission medium. In a distributed computing environment, programs and other data may be located in local and/or remote computer storage media including memory storage devices.

The processor 434 can execute the instructions in memory 436 and can, in some devices, be utilized to control the operation of the entire device. The processor 434 can include a control unit that organizes data and program storage in memory and transfers data and/or other information between the various parts of the imager 432. Although the imager 432 is shown to contain only a single processor 434, the disclosed embodiment also applies to devices that may have multiple processors with some or all performing different functions and/or in different ways.

In some embodiments, imager 432 can include a display (not shown in FIG. 4), which can be part of the imager, or connected thereto, to display information to a user of imager 432. The display may be, for example, a liquid crystal display (LCD), however, any appropriate display device may be used. Further, imager 432 can include any number of displays.

In various embodiments, imager 432 can include a wireless transceiver that can be configured to send and/or receive wireless communication over any suitable communications network through any suitable communications protocol. In some such embodiments of the present disclosure, the wireless transceiver can send and receive long range RF signals, such as mobile phone signals, for example. In other embodiments, the RF transceiver can include a Bluetooth transceiver, a 802.XX transmitter such as a Worldwide Interoperability for Microwave Access (WiMAX) transceiver or a WiFi transceiver, or an active or passive radio-frequency identification (RFID) tag. Other suitable transceivers may include, but are not limited to, any transceiver that has wireless capabilities.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for barcode verification, the method comprising:
    capturing an image of a barcode included with an item and an image of packaging associated with the item proximate to the barcode;
    decoding the image of the barcode included with the item to obtain item identification information represented by the barcode;
    extracting item identification information from the image of the packaging associated with the item, wherein the item identification information from the image of the packaging associated with the item includes a scale-invariant location of a first feature on the package relative to a location of a second feature on the package; and
    determining whether the item identification information decoded from the image of the barcode matches the item identification information extracted from the image of the packaging associated with the item.

2. The method of claim 1, wherein extracting the item identification information from the image of the packaging associated with the item includes extracting a universal product code (UPC) located on the packaging.

3. The method of claim 2, wherein extracting the UPC located on the packaging includes extracting the UPC from a watermark located on the packaging.

4. The method of claim 1, wherein decoding the image of the barcode included with the item to obtain item identification information includes decoding the image of the barcode included with the item to obtain a universal product code.

5. The method of claim 1, wherein the method includes using the item identification information decoded from the image of the barcode to look up item identification information associated with the packaging of the item from a database when the barcode is 1-dimensional, wherein the item identification information includes a feature descriptor from the packaging associated with the item.

6. The method of claim 5, wherein extracting item identification information from the image of the packaging associated with the item includes extracting a feature descriptor from the image of the packaging associated with the item.

7. The method of claim 6, wherein the method includes determining whether the feature descriptor from the packaging associated with the item that is stored in the database matches the feature descriptor extracted from the image of the packaging associated with the item.

8. The method of claim 1, wherein the method includes allowing a transaction associated with the item to proceed when the item identification information decoded from the image of the barcode and the identification information extracted from the image of the packaging associated with the item match.

9. The method of claim 1, wherein capturing the image of the barcode included with the item and the image of packaging associated with the item proximate to the barcode includes:
    capturing an image of the barcode with a barcode scanner; and
    capturing an image of the packaging associated with the item proximate to the barcode with at least one of a scanner and camera.

10. The method of claim 1, wherein the method includes providing a notification when the item identification information decoded from the image of the barcode does not match the item identification information extracted from the image of the packaging associated with the item.

11. A machine-readable non-transitory medium storing instructions for barcode verification, executable by a machine to cause the machine to:
    capture an image of a 2-dimensional (2-D) barcode associated with an item and an image of packaging associated with the item;
    extract a feature descriptor from the image of the packaging associated with the item, wherein the feature descriptor from the image of the packaging associated with the item includes a scale-invariant location of a first feature on the package relative to a location of a second feature on the package;
    extract a numerical representation of the feature descriptor from the image of the 2-D barcode; and
    determine whether the feature descriptor extracted from the image of the packaging associated with the item matches the numerical representation of the feature descriptor extracted from the image of the 2-D barcode.

12. The medium of claim 11, wherein the instructions executable by the machine to cause the machine to extract the feature descriptor from the image of the packaging associated with the item are executable by the machine to cause the machine to extract at least one of a color, texture, and shape from the image of the packaging associated with the item.

13. The medium of claim 12, wherein the instructions are executable by the machine to cause the machine to extract a numerical representation of at least one of the color, texture, and shape from the image of the 2-D barcode associated with the item.

14. The medium of claim 12, wherein the instructions are executable by the machine to perform a quantization of the feature descriptor extracted from the image of the packaging associated with the item.

15. The medium of claim 14, wherein the instructions are executable by the machine to represent the quantization of the feature descriptor extracted from the image of the packaging associated with the item as a numerical value.

16. The medium of claim 15, wherein the instructions are executable by the machine to determine whether the numerical value of the feature descriptor extracted from the image of the packaging associated with the item matches the numerical representation of the feature descriptor extracted from the image of the 2-D barcode.

17. A method for associating a 1-dimensional (1-D) barcode with an item, the method comprising:
    providing item identification information for the item, wherein the item identification information from the image of the packaging associated with the item includes a scale-invariant location of a first feature on the package relative to a location of a second feature on the package;
    embedding the item identification information in packaging of the item;
    encoding the item identification information in the 1-D barcode; and
    positioning the 1-D barcode on the packaging of the item in a position proximate to the item identification information that is embedded on the packaging of the item.

18. The method of claim 17, wherein providing item identification information for the item includes providing a universal product code (UPC) for the item.

19. The method of claim 17, wherein embedding the item identification information in packaging of the item includes embedding the item identification information in a watermark included on the packaging of the item.

20. The method of claim 17, wherein positioning the 1-D barcode on the packaging of the item includes printing the 1-D barcode on the packaging of the item.

* * * * *